(12) United States Patent
Daily et al.

(10) Patent No.: US 10,152,039 B2
(45) Date of Patent: Dec. 11, 2018

(54) METHOD AND APPARATUS FOR THE DISPLAY OF MULTIPLE ERRORS ON A HUMAN-MACHINE INTERFACE

(71) Applicant: ROCKWELL AUTOMATION TECHNOLOGIES, INC., Mayfield Heights, OH (US)

(72) Inventors: Gordon Daily, Solon, OH (US); John McCauley, Germantown, WI (US); Melissa Mack, Painesville TWP, OH (US); Kevin Smith, Franklin, WI (US); Matthew Ericsson, Lyndhurst, OH (US); Matthew Delisle, Glendale, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 384 days.

(21) Appl. No.: 13/671,331

(22) Filed: Nov. 7, 2012

(65) Prior Publication Data

US 2013/0124928 A1    May 16, 2013

Related U.S. Application Data

(60) Provisional application No. 61/558,694, filed on Nov. 11, 2011.

(51) Int. Cl.
*G06F 11/00* (2006.01)
*G05B 19/042* (2006.01)

(52) U.S. Cl.
CPC ............... *G05B 19/0423* (2013.01)

(58) Field of Classification Search
CPC ........... G06F 11/0709; G06F 11/0793; G06F 11/327; G06F 11/0772; G06F 11/0781;
(Continued)

(56) References Cited

U.S. PATENT DOCUMENTS 5,819,028 A * 10/1998 Manghirmalani et al. ..... 714/57
5,956,665 A *  9/1999 Martinez et al. ............. 702/188
(Continued)

FOREIGN PATENT DOCUMENTS

CN      1703672 A    11/2005

OTHER PUBLICATIONS

Design and Research on Storage Format of Dynamic Electronic Cartoon, Chinese Master's Thesis Full-text Database (CMFD), Information Science and Technology, Zhang pan, Nov. 15, 2010, pp. 1137-12.

(Continued)

*Primary Examiner* — Amine Riad

(57) ABSTRACT

One or more non-transitory computer-readable media having stored thereon program instructions to facilitate the display of multiple errors is provided. The program instructions, when executed by a computing system, direct the computing system to at least initiate display of a graphical view of an industrial automation environment. The program instructions also direct the computing system to detect a plurality of error conditions related to machine operations within the industrial automation environment, and to determine a plurality of locations within the graphical view associated with the plurality of error conditions. The program instructions further direct the computing system to identify at least one group of error conditions from the plurality of error conditions based on the plurality of locations, and to initiate display of a graphical representation of the at least one group of the error conditions.

20 Claims, 7 Drawing Sheets

(58) Field of Classification Search
CPC .......... G06F 11/0748; G06F 11/0784; G06F
11/079; G06F 11/07; G06F 11/0715;
G06F 11/0751; G06F 11/0775; G06F
11/0757; G06F 11/006
USPC .......................................................... 714/57
See application file for complete search history.

(56) References Cited

U.S. PATENT DOCUMENTS

| | | | |
|---|---|---|---|
| 6,031,453 A | | 2/2000 | Brinzer |
| 6,269,398 B1* | | 7/2001 | Leong et al. ................ 709/224 |
| 6,456,306 B1* | | 9/2002 | Chin et al. .................. 715/810 |
| 6,577,335 B2* | | 6/2003 | Kobayashi et al. ......... 348/152 |
| 6,664,985 B1* | | 12/2003 | Bormann et al. ............ 715/835 |
| 6,711,838 B2* | | 3/2004 | Staub et al. ................... 37/348 |
| 6,966,033 B1* | | 11/2005 | Gasser et al. ................ 715/738 |
| 7,290,182 B2* | | 10/2007 | Windl ............................ 714/57 |
| 7,925,611 B1* | | 4/2011 | Bromley et al. .............. 706/60 |
| 8,650,490 B2* | | 2/2014 | Hourselt et al. ............. 715/734 |
| 8,666,390 B2* | | 3/2014 | Meredith ............. H04W 24/08 455/404.2 |
| 8,863,003 B2* | | 10/2014 | Kornhall ............... G06F 9/546 715/206 |
| 9,200,905 B2* | | 12/2015 | Johansson ............. G01C 21/32 |
| 2004/0073845 A1* | | 4/2004 | Swoboda ........................ 714/42 |
| 2005/0283733 A1 | | 12/2005 | Ellinger et al. |
| 2006/0087474 A1* | | 4/2006 | Do et al. ....................... 342/386 |
| 2007/0143076 A1 | | 6/2007 | Walacavage et al. |
| 2007/0165031 A1 | | 7/2007 | Gilbert et al. |
| 2008/0300698 A1 | | 12/2008 | Havekost et al. |
| 2012/0110500 A1* | | 5/2012 | Kornhall ................ G06F 9/546 715/781 |
| 2016/0116275 A1* | | 4/2016 | Matsushita .......... G01B 21/042 702/95 |

OTHER PUBLICATIONS

European Application No. 12192252.0-1802 Extended European Search Report, dated May 8, 2017, 7 pages.

Blevins, T.L., et al., "DCS: Operator's Graphics", Chapter 4.13, Instrument Engineers' Handbook, vol. 2: Process Control and Optimization, Jan. 1, 2006, pp. 727-738, 4th Edition.

Yow, Wong Foot, "IntegraXor HMI/SCADA Version 3.7 Tutorial for Beginners", Ecava Sdn Bhd Tutorials, Sep. 27, 2011, pp. 1-57, retrieved from the internet at http://www/integraxor.com/dowload/tutorial.pdf on May 3, 2013.

Fanuc, Ge, "Proficy HMI/SCADA—Cimplicity", Ge Fanuc Automation's catalogs, Sep. 1, 2006, pp. 1-36, retrieved from the internet at http://www.gexpro.com/automation/documents/Proficy/cimplicity/cimplicity_cataloggfa.pdf on Apr. 30, 2013.

Braune, Annerose, et al, "XML-based Monitoring and Operating for Web Services in Automation", Industrial Informatics, 2007 5th IEEE International Conference, Jul. 1, 2007, pp. 797-802.

Extended European Search Report issued by the European Patent Office dated May 27, 2013 in European Application No. 12192237.1, 13 pages.

* cited by examiner

METHOD AND APPARATUS FOR THE DISPLAY OF MULTIPLE ERRORS ON A HUMAN-MACHINE INTERFACE

RELATED APPLICATIONS

This application hereby claims the benefit of and priority to U.S. Provisional Patent Application No. 61/558,694, titled "METHOD AND APPARATUS FOR THE DISPLAY OF MULTIPLE ERRORS ON A HUMAN-MACHINE INTERFACE", filed on Nov. 11, 2011 and which is hereby incorporated by reference in its entirety.

TECHNICAL BACKGROUND

In many industrial environments the quantity and complexity of equipment used requires automation in order to make productive use of the equipment. Automation is enhanced by simplified interfaces between the users of the equipment and the equipment itself. Often this function is provided through the use of a human machine interface, which can be a simple computer including a touch screen or other input device to allow the user to control the equipment.

When problems happen within an industrial environment, they often happen in bunches. Typically each error results in an error message on the human machine interface. When a major crash occurs, a huge number of errors may be generated and all may be displayed one on top of another on the human machine interface. The operator then must sort through all of these errors to determine the often complex cause of the problem.

OVERVIEW

In an embodiment, one or more non-transitory computer-readable media having stored thereon program instructions to facilitate the display of multiple errors is provided. The program instructions, when executed by a computing system, direct the computing system to at least initiate display of a graphical view of an industrial automation environment. The program instructions also direct the computing system to detect a plurality of error conditions related to machine operations within the industrial automation environment, and to determine a plurality of locations within the graphical view associated with the plurality of error conditions.

The program instructions further direct the computing system to identify at least one group of error conditions from the plurality of error conditions based on the plurality of locations, and to initiate display of a graphical representation of the at least one group of the error conditions.

In another embodiment, a method for the display of multiple errors on a human machine interface is provided. The method includes displaying a graphical view of an industrial automation environment, and detecting a plurality of error conditions related to machine operations within the industrial automation environment.

The method also includes determining a plurality of locations within the graphical view associated with the plurality of error conditions, and identifying at least one group of error conditions from the plurality of error conditions based on the plurality of locations. The method further includes displaying a graphical representation of the at least one group of the error conditions.

In a further embodiment, a human machine interface for the display of multiple errors within an industrial automation environment is provided. The human machine interface includes a communication interface configured to receive a plurality of error conditions related to machine operations within the industrial automation environment, and a processor coupled to the communication interface.

The processor is configured to initiate a display of a graphical view of an industrial automation environment, determine a plurality of locations within the graphical view associated with the plurality of error conditions, identify at least one group of error conditions from the plurality of error conditions based on the plurality of locations, and initiate a display of a graphical representation of the at least one group of the error conditions.

This overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
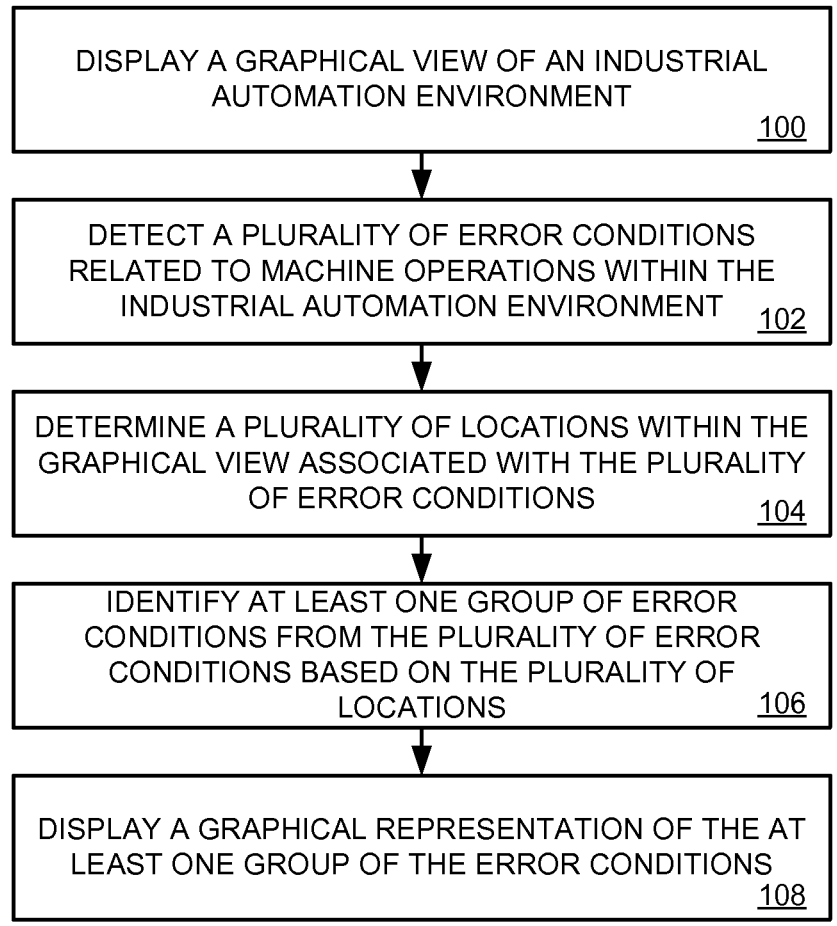
FIG. 1 illustrates a flow chart of a method of displaying a plurality of errors on a human machine interface.

FIG. 1 illustrates a flow chart of a method of displaying a plurality of errors on a human machine interface. In this example embodiment of a method of displaying a plurality of errors on a human machine interface, various graphical elements are created and modified by human machine interfaces such as those illustrated in FIGS. 2 and 4 and described later. Various operations of this method may be performed by one or more human machine interfaces, and there is no need to tie any operation to any specific human machine interface as general purpose computers may be configured to operate as a capable of performing the operations of the method described herein.

Figure 5:
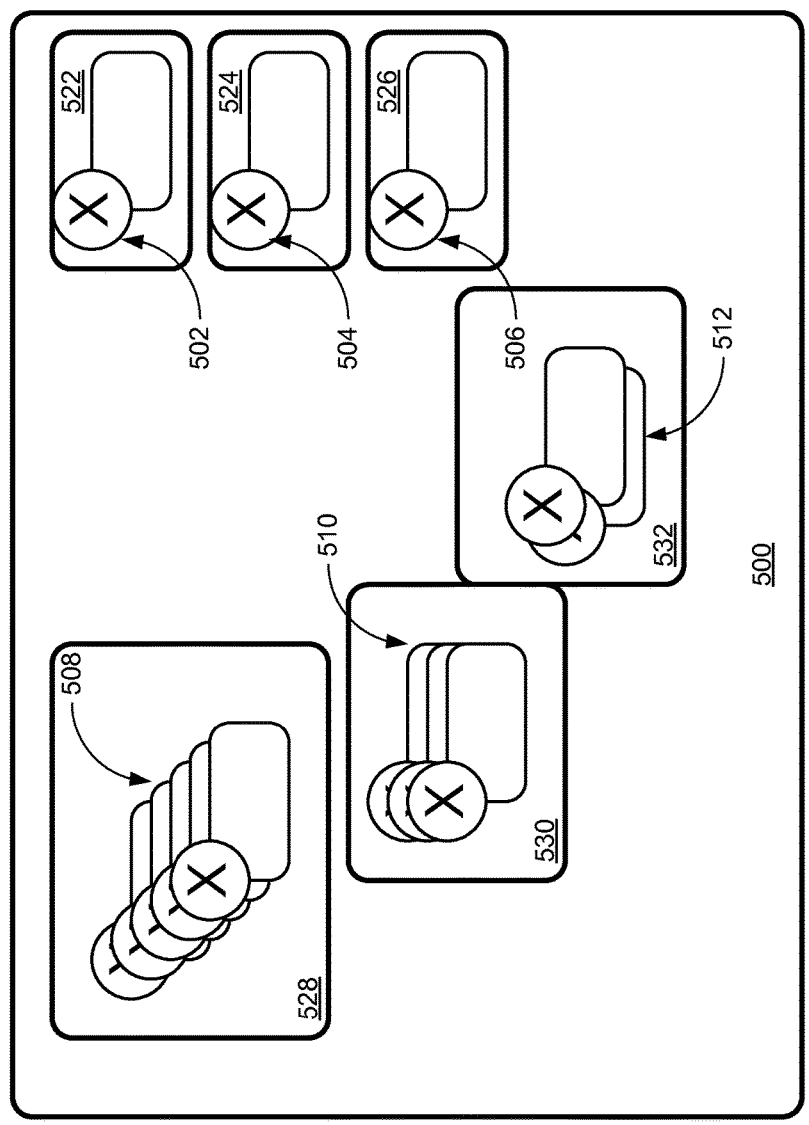
FIG. 5 illustrates a human machine interface screen displaying multiple errors.

A human machine interface displays a graphical view of an industrial automation environment, (operation 100). Typically the industrial automation environment includes a plurality of machines variously coupled with each other. This environment may be graphically displayed using any of a variety of methods including graphically representing each machine within the industrial automation environment. An example graphical view of an industrial environment is illustrated in FIG. 5.

In this example, the human machine interface detects a plurality of error conditions related to machine operations within the industrial automation environment, (operation 102). The human machine interface also determines a plurality of locations within the graphical view associated with the plurality of error conditions, (operation 104). The graphical view illustrated in FIG. 5 also includes a plurality of error conditions at a plurality of locations.

In an example embodiment, determining a plurality of locations within the graphical view associated with the plurality of error conditions includes determining a physical location of one or more machines corresponding to the plurality of error conditions. In another example embodiment, determining a plurality of locations within the graphical view associated with the plurality of error conditions further includes determining a physical location of a control or display within the one or more machines.

The human machine interface identifies at least one group of error conditions from the plurality of error conditions based on the plurality of locations, (operation 106). For example, error conditions having error locations clumped or close together will be grouped together. In some example embodiments, identifying at least one group of error conditions from the plurality of error conditions based on the plurality of locations includes determining at least one distance between locations within the plurality of locations.

Figure 6:
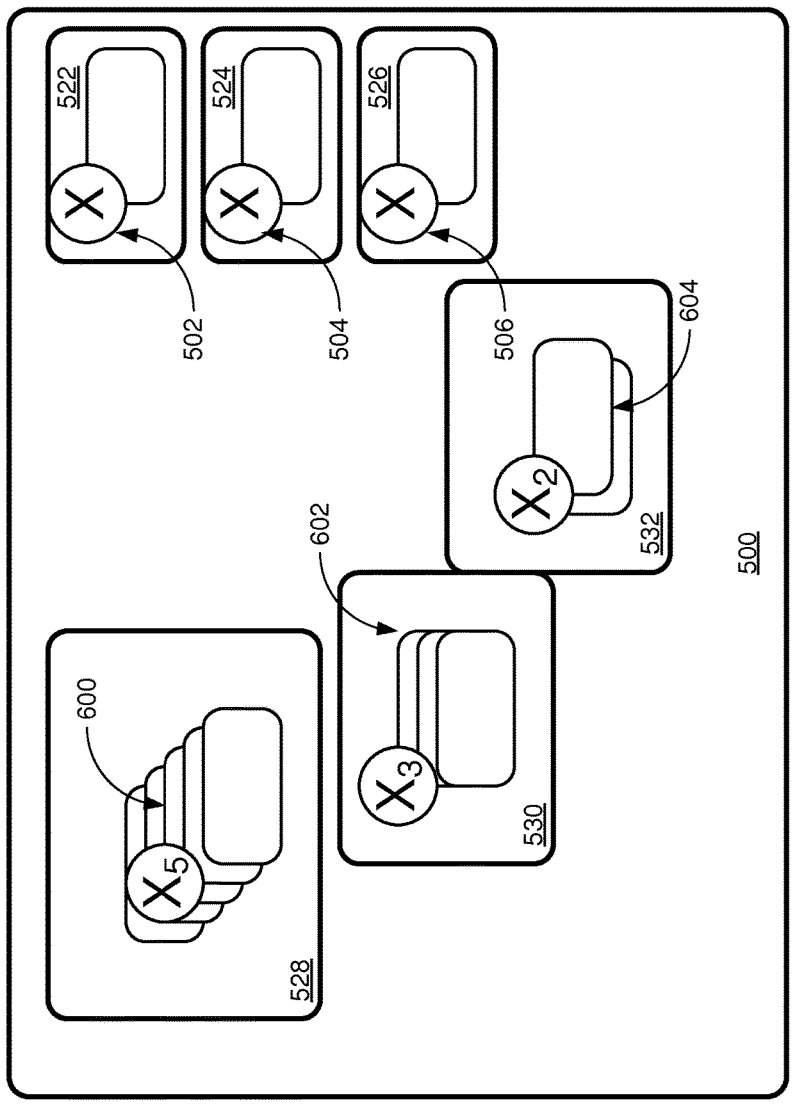
FIG. 6 illustrates a human machine interface screen displaying the multiple errors from FIG. 5 grouped together.

The human machine interface then displays a graphical representation of the at least one group of the error conditions, (operation 108). This grouping allows users to quickly determine between different groups of errors which to concentrate on in searching for a solution to the error condition. Grouping the errors also provides easier access to investigating errors that previously may have been obscured by later errors. This allows users an easy method to ensure that all of the errors get examined. An example graphical representation of several groups of error conditions is illustrated in FIG. 6.

Figure 7:
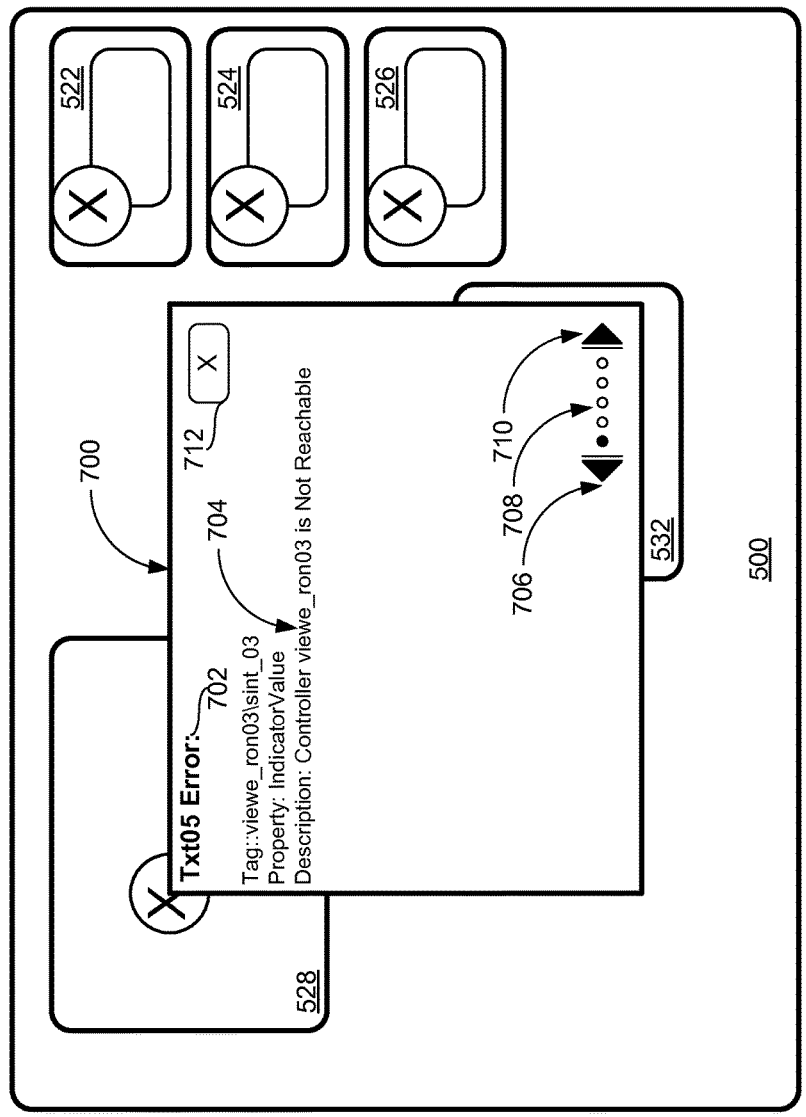
FIG. 7 illustrates a human machine interface screen displaying an error report for one of the errors from FIG. 6.

In some embodiments, the graphical representation of the at least one group of the error conditions, when selected by a user, results in a display of an error report. The error report may include a quantity of error conditions within the at least one group of the error conditions, a representation of a current error identity within the at least one group of the error conditions, a current error description, navigation controls for navigating between error conditions within the at least one group of the error conditions, and the like. An example error report is illustrated in FIG. 7.

In some embodiments, the representation of a current error identity includes a graphical representation. In some example embodiments, the navigation controls include a next error control and a previous error control. These error controls may take any of a wide variety of forms. For example, when a touchscreen is used, swiping the error report in one direction may trigger the display of the next error, while swiping the error report in the opposite direction may trigger the display of the previous error. In further example embodiments, graphical representation of the at least one group of the error conditions includes a number of errors within each of the at least one group of the error conditions.

Figure 2:
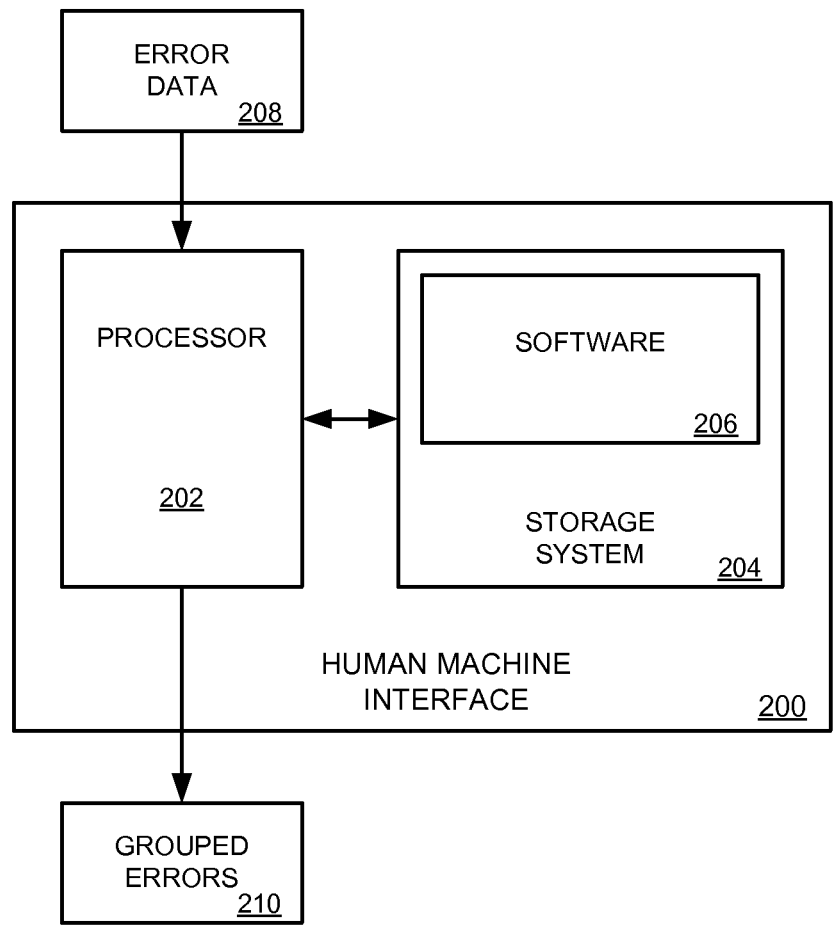
FIG. 2 illustrates a block diagram of a computer system configured to operate as a human machine interface.

Referring now FIG. 2, human machine interface 200 and the associated discussion are intended to provide a brief, general description of a suitable computing environment in which the process illustrated in FIG. 1 may be implemented. Many other configurations of computing devices and software computing systems may be employed to implement a system for the display of multiple errors on a human machine interface.

Figure 4:
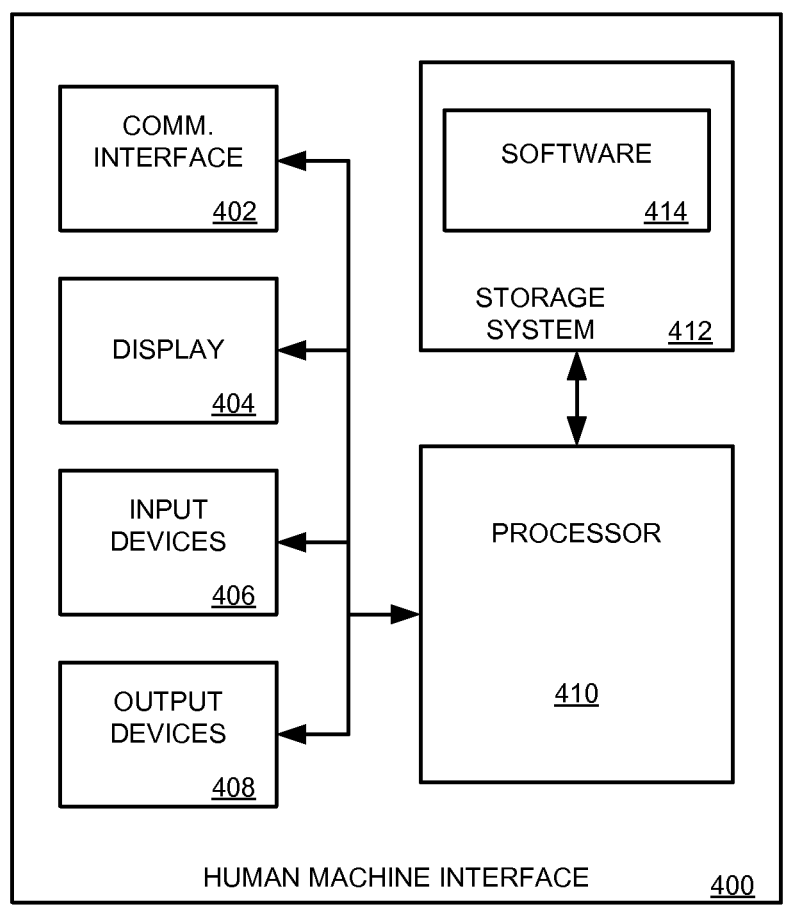
FIG. 4 illustrates a block diagram of a computer system configured to operate as a human machine interface.

Human machine interface 200 may be any type of computing system capable of processing graphical elements, such as a server computer, client computer, internet appliance, or any combination or variation thereof. FIG. 4, discussed in more detail later, provides a more detailed illustration of an example human machine interface. Indeed, human machine interface 200 may be implemented as a single computing system, but may also be implemented in a distributed manner across multiple computing systems. For example, human machine interface 200 may be representative of a server system (not shown) with which the computer systems (not shown) running software 206 may communicate to enable human machine interface features. However, human machine interface 200 may also be representative of the computer systems that run software 206. Indeed, human machine interface 200 is provided as an example of a general purpose computing system that, when implementing the method illustrated in FIG. 1, becomes a specialized system capable of operating as a human machine interface.

Human machine interface 200 includes processor 202, storage system 204, and software 206. Processor 202 is communicatively coupled with storage system 204. Storage system 204 stores human machine interface software 206 which, when executed by processor 202, directs human machine interface 200 to operate as described for the method illustrated in FIG. 1.

Referring still to FIG. 2, processor 202 may comprise a microprocessor and other circuitry that retrieves and executes human machine interface software 206 from storage system 204. Processor 202 may be implemented within a single processing device but may also be distributed across multiple processing devices or sub-systems that cooperate in executing program instructions. Examples of processor 202 include general purpose central processing units, application specific processors, and graphics processors, as well as any other type of processing device.

Storage system 204 may comprise any storage media readable by processor 202 and capable of storing human machine interface software 206. Storage system 204 may include volatile and nonvolatile, removable and non-removable media implemented in any method or technology for storage of information, such as computer readable instructions, data structures, program modules, or other data. Storage system 204 may be implemented as a single storage device but may also be implemented across multiple storage devices or sub-systems. Storage system 204 may comprise additional elements, such as a controller, capable of communicating with processor 202.

Examples of storage media include random access memory, read only memory, magnetic disks, optical disks, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Human machine interface software 206 comprises computer program instructions, firmware, or some other form of machine-readable processing instructions having at least some portion of the method illustrated in FIG. 1 embodied therein. Human machine interface software 206 may be implemented as a single application but also as multiple applications. Human machine interface software 206 may be a stand-alone application but may also be implemented within other applications distributed on multiple devices, including but not limited to other human machine interface software and operating system software.

In general, human machine interface software 206 may, when loaded into processor 202 and executed, transform processor 202, and human machine interface 200 overall, from a general-purpose computing system into a special-purpose computing system customized to act as a human machine interface as described by the method illustrated in FIG. 1 and its associated discussion.

Encoding human machine interface software 206 may also transform the physical structure of storage system 204. The specific transformation of the physical structure may depend on various factors in different implementations of this description. Examples of such factors may include, but are not limited to: the technology used to implement the storage media of storage system 204, whether the computer-storage media are characterized as primary or secondary storage, and the like.

For example, if the computer-storage media are implemented as semiconductor-based memory, human machine interface software 206 may transform the physical state of the semiconductor memory when the software is encoded therein. For example, human machine interface software 206 may transform the state of transistors, capacitors, or other discrete circuit elements constituting the semiconductor memory.

A similar transformation may occur with respect to magnetic or optical media. Other transformations of physical media are possible without departing from the scope of the present description, with the foregoing examples provided only to facilitate this discussion.

Referring again to FIGS. 1 and 2, through the operation of human machine interface 200 employing human machine interface software 206, transformations are performed on error data 208, resulting in grouped errors 210. As an example, error data 208 could be considered transformed from one state to another by the transformation of various elements of graphical error data contained therein.

Human machine interface 200 may have additional devices, features, or functionality. Human machine interface 200 may optionally have input devices such as a keyboard, a mouse, a voice input device, or a touch input device, and comparable input devices. Output devices such as a display, speakers, printer, and other types of output devices may also be included. Human machine interface 200 may also contain communication connections and devices that allow human machine interface 200 to communicate with other devices, such as over a wired or wireless network in a distributed computing and communication environment. These devices are well known in the art and need not be discussed at length here.

Figure 3:
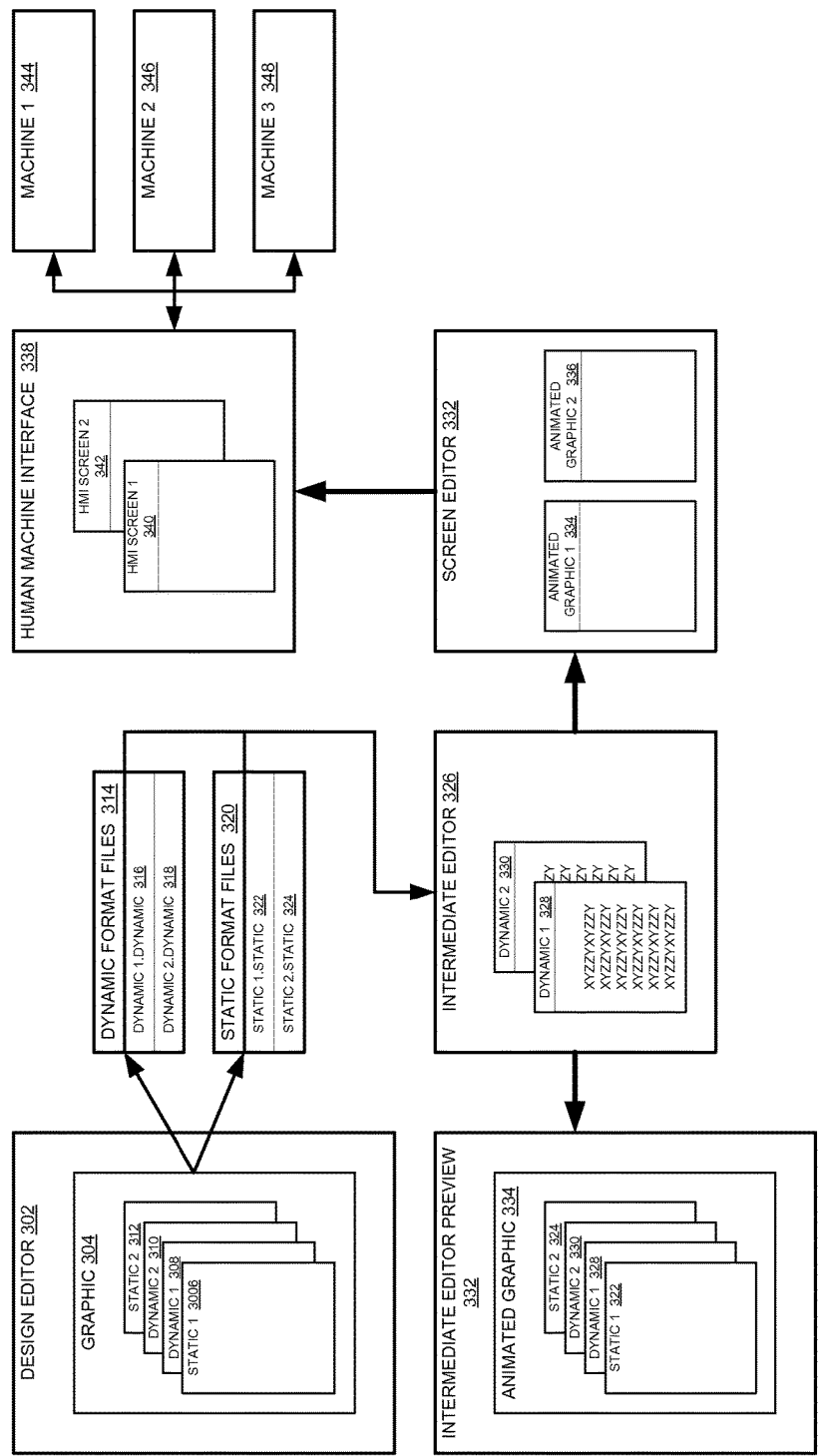
FIG. 3 illustrates a workflow diagram of the workflow associated with the computer aided design of human mechanical interface graphical elements.

FIG. 3 illustrates a workflow diagram of the workflow associated with the design of human mechanical interface graphical elements. FIG. 3 is included to illustrate the environment in which human machine interfaces are developed and used.

A graphic 304 is designed within design editor 302. Graphic 304 includes four components: static 1 component 306, dynamic 1 component 308, dynamic 2 component 310, and static 2 component 312. These four components may be placed on one or more layers within graphic 304.

Dynamic 1 component 308 and dynamic 2 component 310 are converted into dynamic format files 314 as DYNAMIC 1.DYNAMIC 316 and DYNAMIC 2.DYNAMIC 318 respectively. Static 1 component 306 and static 2 component 312 are converted into static format files 320 as STATIC 1.STATIC 322 and STATIC 2.STATIC 324. These four files are then exported into intermediate editor 326, where the dynamic components may be edited to add properties and bindings.

In an example embodiment, the dynamic files are in an extensible markup language, and intermediate editor 326 includes a markup language editor, providing a user with a means of adding properties and bindings to the dynamic components. In some examples, intermediate editor 326 includes intermediate editor preview 332, where the modified dynamic components may be previewed in conjunction with their associated static components to insure that the modifications to the dynamic components are error free. In this example, intermediate editor preview 332, displays animated graphic 334 on a display device. Animated graphic 334 includes four components: static 1 component 322, modified dynamic 1 component 328, modified dynamic 2 component 330, and static 2 component 324.

Once the desired modifications to the dynamic components have been made in the intermediate editor, the graphic is exported into screen editor 332, where human machine interface screens are assembled and tested. In this example, screen editor 332 displays animated graphic 1 334 and animated graphic 2 336 for incorporation into a human machine interface screen.

Human machine interface 338 is configured to display a plurality of human machine interface screens such as human machine interface screen 1 340 and human machine interface screen 2 342 as illustrated in FIG. 3. Animated graphical elements with any or all of these screens may correspond to first machine 344, second machine 346, and/or third machine 348.

FIG. 4 illustrates a block diagram of a computer system configured to operate as a human machine interface 400. The method illustrated in FIG. 1 is implemented on one or more human machine interfaces 400, as shown in FIG. 4. Human machine interface 400 includes communication interface 402, display 404, input devices 406, output devices 408, processor 410, and storage system 412. Processor 410 is linked to communication interface 402, display 404, input devices 406, output devices 408, and storage system 412. Storage system 412 includes a non-transitory memory device that stores operating software 414.

Communication interface 402 includes components that communicate over communication links, such as network cards, ports, RF transceivers, processing circuitry and software, or some other communication devices. Communication interface 402 may be configured to communicate over metallic, wireless, or optical links. Communication interface 402 may be configured to use TDM, IP, Ethernet, optical networking, wireless protocols, communication signaling, or some other communication format—including combinations thereof.

Display 404 may be any type of display capable of presenting information to a user. Displays may include touch screens in some embodiments. Input devices 406 include any device capable of capturing user inputs and transferring them to computer aided design system 400. Input devices 406 may include a keyboard, mouse, touch pad, or some other user input apparatus. Output devices 408 include any device capable of transferring outputs from computer aided design system 400 to a user. Output devices 408 may include printers, projectors, displays, or some other user output apparatus. Display 404, input devices 406, and output devices 408 may be external to computer aided design system 400 or omitted in some examples.

Processor 410 includes a microprocessor and other circuitry that retrieves and executes operating software 414 from storage system 412. Storage system 412 includes a disk drive, flash drive, data storage circuitry, or some other non-transitory memory apparatus. Operating software 414 includes computer programs, firmware, or some other form of machine-readable processing instructions. Operating software 414 may include an operating system, utilities, drivers, network interfaces, applications, or some other type of software. When executed by processing circuitry, operating software 414 directs processor 410 to operate human machine interface 400 according to the method illustrated in FIG. 1.

In this example, human machine interface 400 executes a number of methods stored as software 414 within storage system 412. The results of these methods are displayed to a user via display 404, or output devices 408. Input devices 406 allow a plurality of machines to send machine data and error data to human machine interface 400.

For example, processor 410 receives machine data and/or error data either from communication interface 402 or input devices 406. Processor 410 then operates on the machine data and error data to produce grouped error messages which may be stored in storage system 412, displayed on display 404, or output through output devices 408.

FIG. 5 illustrates a human machine interface screen 500 displaying multiple errors. In this example embodiment, an industrial automation environment includes six machine systems 522-532 graphically illustrated on human machine interface screen 500.

Machines 522, 524, and 526 each have one error represented by elements 502, 504, and 506. Machine 528 has five errors collectively represented by element 508. Machine 530 has three errors collectively represented by element 510. Machine 532 has two errors collectively represented by element 512.

Note that numerous error messages associated with the errors on machines 528, 530, and 532 are unreadable since they are at least partially covered by other error messages.

FIG. 6 illustrates a human machine interface screen 500 displaying the multiple errors from FIG. 5 grouped together. In this example embodiment, the five errors from machine 528 have been grouped together into a single error element 600. Error element 600 includes a single error button indicating the number of errors in error element 600 along with five error tabs representing the five errors in the group. Other embodiments may combine the five error tabs into a single error tab. The three errors from machine 530 have been grouped together into a single error element 602. Error element 602 includes a single error button indicating the number of errors in error element 602 along with three error tabs representing the three errors in the group. Other embodiments may combine the three error tabs into a single error tab. The two errors from machine 532 have been grouped together into a single error element 604. Error element 604 includes a single error button indicating the number of errors in error element 604 along with two error tabs representing the two errors in the group. Other embodiments may combine the two error tabs into a single error tab. The single errors from machines 502, 504, and 506 remain unchanged.

Notice that error elements 600, 602, and 604 include an indication of the number of errors each contains represented by a numerical subscript within the graphical grouped error element.

FIG. 7 illustrates a human machine interface screen 500 displaying an error report for one of the errors from FIG. 6. When a user selects a grouped error element an error report is displayed. This selection may occur through any of a variety of mechanisms including, but not limited to, a touch screen, a mouse click, a cursor hover, or the like.

In this example embodiment, a user has selected group error element 600 from FIG. 6 for closer inspection. In response to the selection, error report 700 is displayed. In this example embodiment, error report 700 includes a number of elements.

Error report 700 includes error name or number 702, error description 704, and error report close button 712. Error report 700 also includes navigation controls 706, 708, and 710 useful for navigating between each of the errors that have been grouped together into group error element 600. Navigation control 706 is a previous error control which, when selected by the user, causes error report 700 to display information related to a previous error. Navigation control 710 is a next error control which, when selected by the user, causes error report 700 to display information related to a next error.

Navigation control 708 is a representation of a current error identity within the at least one group of the error conditions. In this example embodiment, navigation control 708 graphically represents that five errors are included in the current group of errors by displaying a line of five circles. The fact that the user is currently viewing the first of the five errors is indicated by the fact that the first of the five circles is filled in. Many other methods of representing a current error identity may be used in place of this graphical representation. For example, other embodiments may display error numbers, error identities, or the like.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. One or more non-transitory computer-readable media having stored thereon program instructions to facilitate display of multiple errors, wherein the program instructions, when executed by a computing system, direct the computing system to at least:

receive machine data indicative of states of multiple machines within an industrial automation environment;

generate, on a screen of a human machine interface, a graphical view of the industrial automation environment graphically representing each of the multiple machines variously coupled to each other;

detect, based on the machine data, a plurality of error conditions related to machine operations of the multiple machines within the industrial automation environment;

initiate display of the plurality of error conditions on the screen of the human machine interface, wherein each error condition is displayed at a respective error location within the graphical view of the industrial automation environment;
determine a plurality of error locations within the graphical view of the respective error locations of the plurality of error conditions,
wherein to determine the plurality of error locations, a physical location of one or more machines corresponding to the plurality of error conditions is determined;
identify at least one group of error conditions from the plurality of error conditions based on a distance between the respective error locations of the at least one group of error conditions within the graphical view;
combine the at least one group of error conditions into a single error element comprising the identified at least one group of error conditions;
substitute, on the screen of the human machine interface, a graphical representation of the single error element for the display of the at least one group of error conditions;
receive, via the human machine interface, a user selection of the graphical representation of the single error element; and
in response to receiving the user selection of the graphical representation of the single error element, generate and display an error report on the screen of the human machine interface based on the single error element.

2. The one or more non-transitory computer-readable media of claim 1, wherein to determine a plurality of error locations within the graphical view associated with the plurality of error conditions the computing system determines a physical location of a control or display within the one or more machines.

3. The one or more non-transitory computer-readable media of claim 1, wherein the display of the error report includes at least:
a quantity of error conditions within the single error element;
a representation of a current error identity within the single error element;
a current error description; and
navigation controls for navigating between error conditions within the single error element.

4. The one or more non-transitory computer-readable media of claim 3, wherein the representation of a current error identity includes a graphical representation.

5. The one or more non-transitory computer-readable media of claim 3, wherein the navigation controls include a next error control and a previous error control.

6. The one or more non-transitory computer-readable media of claim 1, wherein the graphical representation of the single error element includes a number of errors within each error condition of the single error element.

7. The one or more non-transitory computer-readable media of claim 1, wherein identifying at least one group of error conditions from the plurality of error conditions based on the plurality of error locations includes determining at least one distance between locations within the plurality of error locations.

8. The one or more non-transitory computer-readable media of claim 1, wherein to generate the graphical view of the industrial automation environment graphics animated graphics are created using layers a static component and a dynamic component.

9. The one or more non-transitory computer-readable media of claim 1, wherein the display of the plurality of error conditions on the screen of the human machine interface includes two or more of the plurality of error condition that overlap making at least one of the plurality of error conditions at least partially unreadable.

10. The one or more non-transitory computer-readable media of claim 9, wherein the two or more of the plurality of error conditions that overlap are combined into the at least one group of error conditions.

11. A method for facilitating display of multiple errors on a human machine interface, the method comprising:
receiving machine data indicative of states of multiple machines within an industrial automation environment;
displaying, on a screen of the human machine interface, a graphical view of the industrial automation environment having multiple machines,
wherein the graphical view includes a representation of each of the multiple machines within the industrial automation environment;
processing, by the human machine interface, the machine data reported by the multiple machines to automatically detect a plurality of error conditions related to machine operations within the industrial automation environment;
initiating display of the plurality of error conditions on the screen of the human machine interface,
wherein each error condition is displayed at a respective error location within the graphical view of the industrial automation environment;
determining a plurality of error locations within the graphical view of the respective error locations of the plurality of error conditions,
wherein determining the plurality of error locations within the graphical view associated with the plurality of error conditions includes determining a physical location each of the one or more machines corresponding to the plurality of error conditions;
identifying at least one group of error conditions from the plurality of error conditions based on a distance between the respective error locations of the at least one group of error conditions within the graphical view of the industrial automation environment;
combining, on the screen of the human machine interface, the at least one group of error conditions into a single error element comprising the identified at least one group of error conditions;
substituting display of a graphical representation of the single error element for the display of the at least one group of error conditions;
receiving, via the human machine interface, a user selection of the graphical representation of the single error element via the human machine interface; and
in response to receiving the user selection of the single error element, displaying an error report on the screen of the human machine interface based on the single error element.

12. The method of claim 11, wherein determining the plurality of error locations within the graphical view associated with the plurality of error conditions further includes determining a physical location of a control or display within the one or more machines.

13. The method of claim 11, wherein the display of the error report includes at least:
a quantity of error conditions within the single error element;

a representation of a current error identity within single error element;

a current error description; and navigation controls for navigating between error conditions within the single error element.

14. The method of claim 13, wherein the representation of a current error identity includes a graphical representation.

15. The method of claim 13, wherein the navigation controls include a next error control and a previous error control.

16. The method of claim 11, wherein the graphical representation of the single error element includes a number of errors within each error conditions of the single error element.

17. The method of claim 11, wherein identifying at least one group of error conditions from the plurality of error conditions based on the plurality of error locations includes determining at least one distance between error locations within the plurality of error locations.

18. A human machine interface for the display of multiple errors within an industrial automation environment, the human machine interface comprising:

a communication interface configured to receive, from one or more sources within the industrial automation environment, a plurality of error conditions related to machine operations within the industrial automation environment; and a processor coupled to the communication interface configured to:

generate a graphical view of an industrial automation environment on a screen of a human machine interface, the graphical view including a graphical representation each machine within the industrial automation environment;

display the plurality of error conditions received from the one or more sources within the industrial automation environment, each error condition at a respective error location within the graphical view of the industrial automation environment;

determine a plurality of error locations within the graphical view of the respective error locations of the plurality of error conditions, wherein to determine the plurality of error locations within the graphical view, a physical location of one or more machines corresponding to the plurality of error conditions is determined;

identify at least one group of error conditions from the plurality of error conditions based on a distance between the respective error locations of the at least one group of error conditions within the graphical view;

combine the at least one group of error conditions into a single error element comprising the identified at least one group of error conditions;

substitute display of a graphical representation of the single error element for the display of the at least one group of error conditions;

receive a user selection of the graphical representation of the single error element via the human machine interface; and in response to receiving the user selection of the graphical representation of the single element, generate and display an error report on the screen of the human machine interface based on the single error element.

19. The human machine interface of claim 18, wherein the display of the error report includes at least:

a quantity of error conditions within the single error element;

a representation of a current error identity within the single error element;

a current error description; and navigation controls for navigating between error conditions within the single error element.

20. The human machine interface of claim 18, wherein the graphical representation of the single error element includes a number of errors within each error condition of the single error element.

* * * * *